(12) United States Patent
Kim et al.

(10) Patent No.: US 12,712,191 B2
(45) Date of Patent: Aug. 18, 2026

(54) SOLID OXIDE CELL STACK

(71) Applicant: SAMSUNG ELECTRO-MECHANICS CO., LTD., Suwon-si (KR)

(72) Inventors: Sung Han Kim, Suwon-si (KR); Jong Ho Chung, Suwon-si (KR); Jung Ho Shim, Suwon-si (KR); Jae Hyuk Jang, Suwon-si (KR); Bon Seok Koo, Suwon-si (KR); Hong Ryul Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 610 days.

(21) Appl. No.: 18/204,534

(22) Filed: Jun. 1, 2023

(65) Prior Publication Data

US 2024/0213509 A1 Jun. 27, 2024

(30) Foreign Application Priority Data

Dec. 22, 2022 (KR) ........................ 10-2022-0181492

(51) Int. Cl.
*H01M 8/1233* (2016.01)
*H01M 8/0273* (2016.01)
(Continued)

(52) U.S. Cl.
CPC ....... *H01M 8/1233* (2013.01); *H01M 8/0273* (2013.01); *H01M 8/04067* (2013.01);
(Continued)

(58) Field of Classification Search
CPC ............. H01M 8/1233; H01M 8/2432; H01M 8/2484; H01M 8/0273; H01M 8/04067; H01M 2008/1293
(Continued)

(56) References Cited

U.S. PATENT DOCUMENTS 8,785,074 B2 7/2014 Edmonston et al.
10,923,735 B1 2/2021 Leming
(Continued)

FOREIGN PATENT DOCUMENTS

KR 10-2007-0036482 A 4/2007
KR 10-2009-0108894 A 10/2009
(Continued)

OTHER PUBLICATIONS

Written Opinion for PCT/KR2023/007318. (Year: 2023).*
Search Report issued Sep. 12, 2023 for corresponding International Patent Application No. PCT/KR2023/007318.

*Primary Examiner* — Patricia L. Hailey
(74) *Attorney, Agent, or Firm* — MORGAN, LEWIS & BOCKIUS LLP

(57) ABSTRACT

A solid oxide cell stack includes a first end plate having a flow path, a solid oxide cell disposed on the first end plate, and a second end plate including a lower region disposed on the solid oxide cell and having a first through-hole, and an upper region disposed on the lower region and having a second through-hole. In the second end plate, an inner sidewall of the upper region forming the second through-hole is inclined such that a width of the second through-hole increases in an upward direction.

20 Claims, 8 Drawing Sheets

(51) Int. Cl.

| | |
|---|---|
| ***H01M 8/04007*** | (2016.01) |
| ***H01M 8/12*** | (2016.01) |
| ***H01M 8/2432*** | (2016.01) |
| ***H01M 8/2484*** | (2016.01) |

(52) U.S. Cl.
CPC ....... *H01M 8/2432* (2016.02); *H01M 8/2484* (2016.02); *H01M 2008/1293* (2013.01)

(58) Field of Classification Search
USPC .................................................. 429/465, 457
See application file for complete search history.

(56) References Cited

U.S. PATENT DOCUMENTS

| | | | |
|---|---|---|---|
| 2005/0074652 | A1 | 4/2005 | Choi |
| 2008/0274389 | A1 | 11/2008 | Roh et al. |
| 2010/0009231 | A1 | 1/2010 | Kim et al. |
| 2018/0277879 | A1 | 9/2018 | Yamaura |
| 2022/0231308 | A1 | 7/2022 | Armstrong et al. |

FOREIGN PATENT DOCUMENTS

| | | | | |
|---|---|---|---|---|
| KR | 10-2018-0019030 | A | 2/2018 | |
| KR | 10-2019-0011142 | A | 2/2019 | |
| KR | 10-2021-0030906 | A | 3/2021 | |
| KR | 10-2022-0098769 | A | 7/2022 | |
| WO | WO-0245198 | A2 * | 6/2002 | .......... H01M 8/1231 |
| WO | 2019/231975 | A1 | 12/2019 | |
| WO | 2021/096828 | A1 | 5/2021 | |

* cited by examiner

SOLID OXIDE CELL STACK

CROSS-REFERENCE TO RELATED APPLICATION (S)

This application claims the benefit of priority to Korean Patent Application No. 10-2022-0181492 filed on Dec. 22, 2022 in the Korean Intellectual Property Office, the disclosure of which is incorporated herein by reference in its entirety.

TECHNICAL FIELD

The present disclosure relates to a solid oxide cell stack.

BACKGROUND

A solid oxide fuel cell (SOFC) and a solid oxide electrolysis cell (SOEC) include a cell composed of an air electrode, a fuel electrode, and a solid electrolyte having oxygen ion conductivity. In this case, the cell may be referred to as a solid oxide cell. The solid oxide cell produces electrical energy through an electrochemical reaction or produces hydrogen by electrolyzing water through the reverse reaction of a solid oxide fuel cell. Compared to other types of fuel cells or electrolysis cells, such as phosphoric acid fuel cells (PAFC), alkali fuel cells (AFC), polymer electrolyte fuel cells (PEMFC) and direct methanol fuel cells (DMFC), solid oxide cells have low overvoltage and low irreversible loss based on low activation polarization, and thus have high efficiency. In addition, as such a solid oxide cell may be used with carbon or a hydrocarbon-based fuel as well as hydrogen, there is a wide range of fuel choices, and since the reaction rate at the electrode is high, the solid oxide cell has the advantage of not requiring relatively expensive precious metals as an electrode catalyst.

Solid oxide cells are generally used in a stack structure disposed between a pair of end plates, and in this case, the end plate may include a flow path through which fluid may flow. In this technical field, there is a growing need to improve efficiency in introducing air into the solid oxide cell or reliability of the solid oxide cell stack.

SUMMARY

An aspect of the present disclosure is to implement a solid oxide cell stack having an end plate with improved air inflow efficiency.

According to an aspect of the present disclosure, a novel structure of a solid oxide cell stack is provided. The solid oxide cell stack includes a first end plate having a flow path; a solid oxide cell disposed on the first end plate; and a second end plate including a lower region disposed on the solid oxide cell and having a first through-hole, and an upper region disposed on the lower region and having a second through-hole. In the second end plate, an inner sidewall of the upper region forming the second through-hole is inclined such that a width of the second through-hole increases in an upward direction.

In an embodiment, a width of the second through-hole may be greater than a width of the first through-hole.

In an embodiment, a plurality of first through-holes may be disposed within the second through-hole when viewed from above.

In an embodiment, the upper region may include a plurality of second through-holes.

In an embodiment, when viewed from above, a plurality of the first through-holes may be disposed in each of the plurality of second through-holes.

In an embodiment, the first through-hole may have a uniform width.

In an embodiment, an inner side wall of the lower region forming the first through-hole may be vertically disposed with respect to an upper surface of the solid oxide cell.

In an embodiment, a thickness of the upper region may be greater than a thickness of the lower region.

In an embodiment, a thickness of the lower region may be greater than or equal to a thickness of the upper region.

In an embodiment, the solid oxide cell stack may further include a fastening portion coupling the first and second end plates.

In an embodiment, the fastening portion may have a lower coefficient of thermal expansion than the first and second end plates.

In an embodiment, a current collecting layer may be formed on a surface of at least one of the first and second end plates facing the solid oxide cell.

In an embodiment, the solid oxide cell stack may further include a terminal portion connected to the current collecting layer.

In an embodiment, the first end plate may include a groove provided around the flow path and may further include a sealant disposed in the groove to cover a side surface of the solid oxide cell.

In an embodiment, the solid oxide cell stack may further include a gasket and a stopper disposed outside the flow path, between the first and second end plates.

In an embodiment, the solid oxide cell may include a fuel electrode, an air electrode, and an electrolyte disposed therebetween, the fuel electrode may be disposed on a side of the first end plate, and the air electrode may be disposed on a side of the second end plate.

According to another aspect of the present disclosure, a solid oxide cell stack includes a first end plate having a flow path; a solid oxide cell disposed on the first end plate; and a second end plate including a lower region disposed on the solid oxide cell and having a first through-hole, and an upper region disposed on the lower region and having a second through-hole. When viewed from above, the first through-hole is disposed in plural in the second through-hole.

In an embodiment, a width of the second through-hole increases in an upward direction.

In an embodiment, a width of the first through-hole is constant in an upward direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
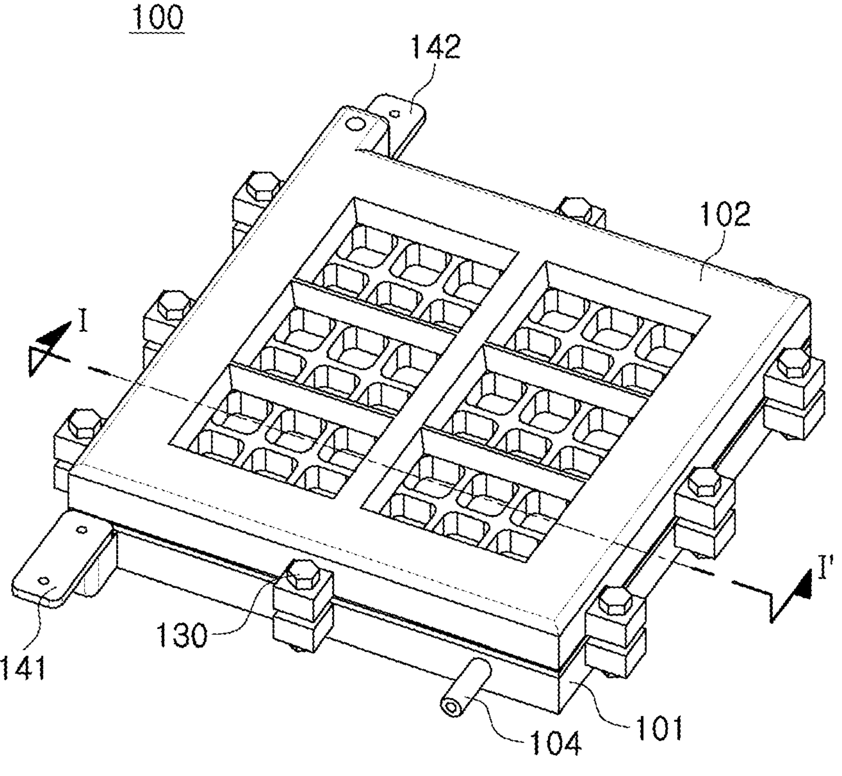
FIG. 1 is a perspective view schematically illustrating the appearance of a solid oxide cell stack according to an embodiment.

Hereinafter, embodiments will be described with reference to detailed embodiments and accompanying drawings.

However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

To clearly describe the present disclosure in the drawings, parts irrelevant to the description are omitted, and to clearly express the various layers and regions, the thickness is enlarged and illustrated, and elements having the same function within the scope of the same concept are described using the same reference numerals. Furthermore, throughout the specification, when a certain component is said to "include", it means that it may further include other components without excluding other components unless otherwise stated.

Figure 2:
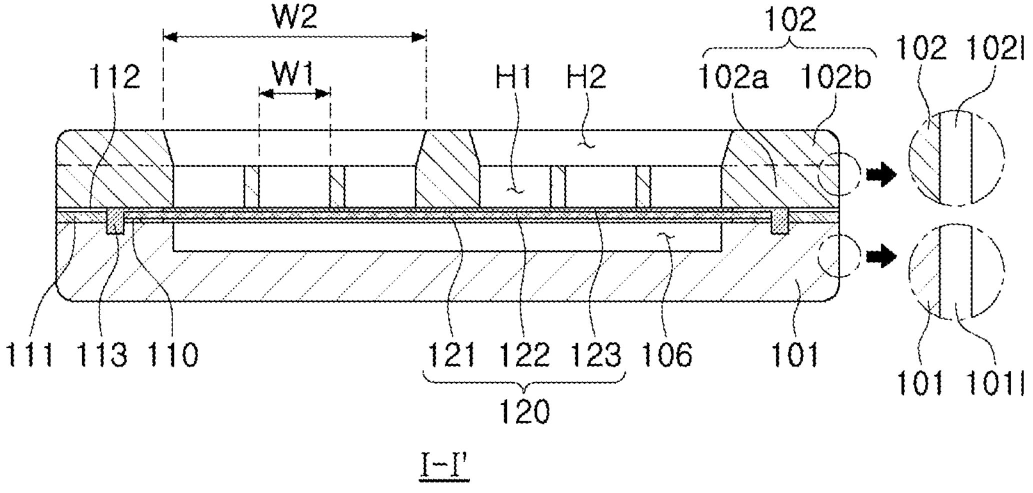
FIG. 2 illustrates an example of a cross section taken along line I-I' in the solid oxide cell stack of FIG. 1.

FIG. 1 is a perspective view schematically illustrating the appearance of a solid oxide cell stack according to an embodiment. FIG. 2 illustrates an example of a cross-sectional view of the solid oxide cell stack of FIG. 1, taken along line I-I'. FIGS. 3 to 11 illustrate components of the solid oxide cell stack of FIG. 1.

A solid oxide cell stack 100 according to an embodiment includes a first end plate 101, a solid oxide cell 120, and a second end plate 102 as main components. In this case, the second end plate 102 includes a lower region 102*a* having a first through-hole H1 and an upper region 120*b* including a second through-hole H2. In the second end plate 102, the inner side wall of the upper region 102*b* forming the second through-hole H2 is inclined so that the width W2 increases as the second through-hole H2 goes upward, and by having this through-hole structure, the efficiency of gas inflow into and outflow from the solid oxide cell stack 100 may be significantly improved. Hereinafter, components of the solid oxide cell stack 100 will be described in detail, and a case in which the solid oxide cell stack 100 is used as a fuel cell will be mainly described. However, the solid oxide cell stack 100 may also be used as an electrolysis cell, and in this case, a reaction opposite to the case of the fuel cell will occur in a fuel electrode 121 and an air electrode 123 of the solid oxide cell 120.

The first and second end plates 101 and 102 may include a metal having a high melting point so as not to melt or soften even when the solid oxide cell 120 operates at a high temperature, and may have a planar structure of such a metal. For example, the first and second end plates 101 and 102 may use a material such as nickel-based, iron-based, or stainless steel. In addition, when the operating temperature of the solid oxide cell stack 100 is relatively low, for example, if it is as low as 800° C. or less, copper or copper alloys with good conductivity may be used.

Figure 3:
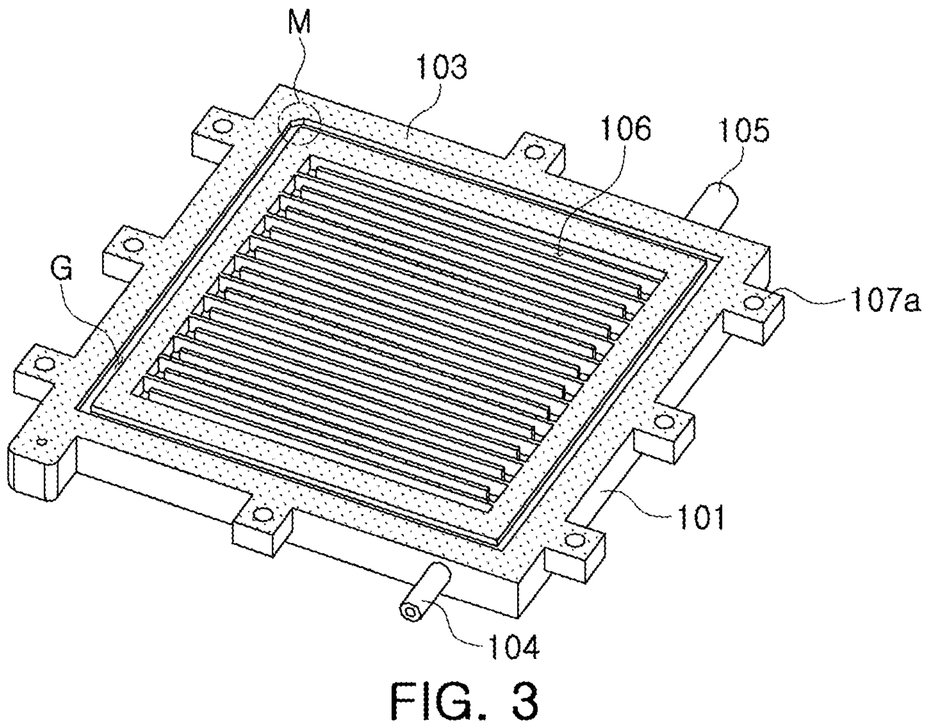
FIGS. 3 to 11 illustrate components of the solid oxide cell stack of FIG. 1.

Referring to FIG. 3, the first end plate 101 includes a flow path 106 through which fluid flows, and in this case, the flow path 106 may be implemented in a meandering shape, for example, a serpentine-shaped slit structure. The serpentine-shaped flow path 106 may allow fuel injected through a fluid inlet 104 to be uniformly supplied to the solid oxide cell 120. Referring to FIG. 3, a current collecting layer 103 may be formed on a surface of the first end plate 101 facing the solid oxide cell 120. The current collecting layer 103 may preferably have excellent oxidation resistance to maintain excellent electrical conductivity. Considering these characteristics, the current collecting layer 103 may be formed by coating a material such as gold or silver. In this case, the coating process may use electroplating or non-electrolytic plating, deposition, or the like to prevent delamination at high temperatures. In addition, as will be described later, another current collecting layer 108 may also be formed on the surface of the second end plate 102 facing the solid oxide cell 120. However, it will not be necessary to form the current collecting layers 103 and 108 on both the first and second end plates 101 and 102. A ceramic coating layer 101I may be formed on at least a portion of the remaining area of the first end plate 101 except for the area where the current collecting layer 103 is formed. The ceramic coating layer 101I provides excellent oxidation resistance at a high temperature, and thus durability of the first end plate 101 may be improved. In addition, a ceramic coating layer 102I may be formed on at least a portion of the remaining area of the second end plate 102 except for the area where the current collecting layer 108 is formed. However, it will not be necessary to form a ceramic coating layer on both the first and second end plates 101 and 102.

As illustrated in FIG. 3, the first end plate 101 may include a fluid inlet 104 and a fluid outlet 105. In this case, the fluid inlet 104 and the fluid outlet 105 may be disposed on opposite sides of the first end plate 101, respectively, and also, may be disposed in positions facing each other. As will be described later, in the plurality of solid oxide cell stacks 100, the fluid inlets 104 and the fluid outlets 105 may be connected to each other in series or in parallel, and to this end, may be designed to have different sizes to be coupled in pairs. In addition, a marking portion M may be formed on the first end plate 101 such that the fuel electrode 121 and the air electrode 123 of the solid oxide cell 120 are positioned in a set direction to prevent assembly mistakes from occurring.

Figure 4:
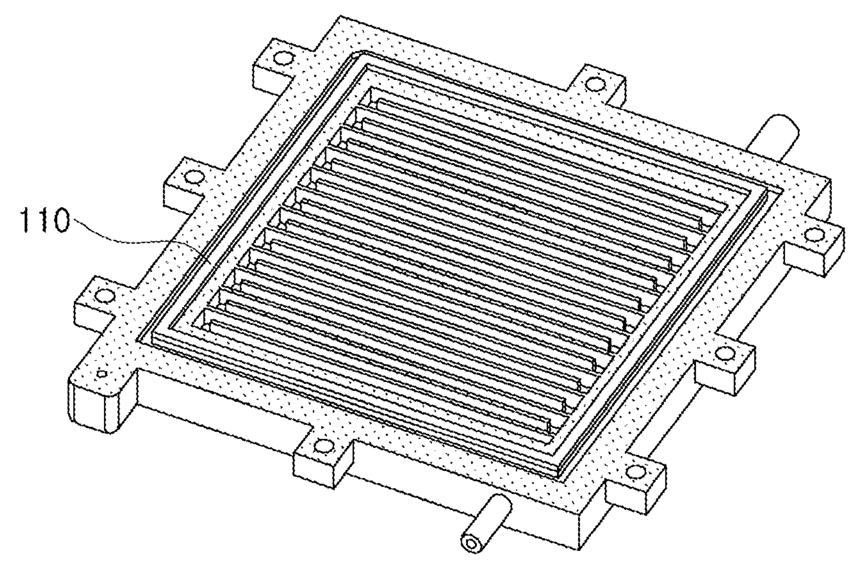

The first end plate 101 may have a through-hole 107*a* in the outer portion, to be coupled to the second end plate 102. Similarly, the second end plate 102 may also have a through-hole (see 107*b* in FIG. 9) in the outer portion. Fastening portions 130 may be disposed in the through-holes 107*a* and 107*b* of the first and second end plates 101 and 102 to couple the first and second end plates 101 and 102. In addition, the first end plate 101 may include a groove G formed around the flow path 106, and as illustrated in FIG. 4, an inner gasket 110 may be disposed in the groove G. The inner gasket 110 may perform a primary sealing function for gas or liquid, but may be excluded depending on an embodiment.

Figure 5:
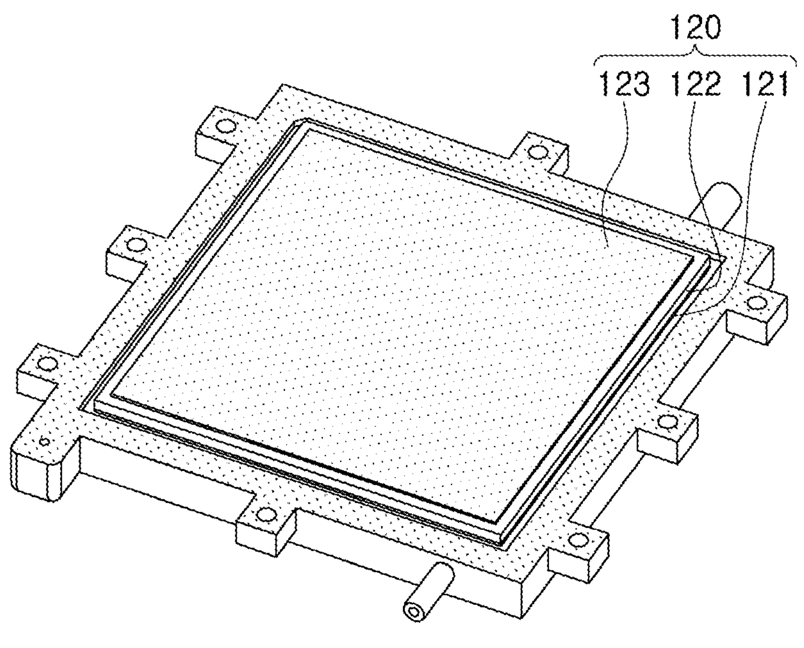

Referring to FIG. 5, the solid oxide cell 120 is disposed on the first end plate 101 and corresponds to a functional layer of a fuel cell or water electrolysis cell. In detail, the solid oxide cell 120 may include a fuel electrode 121, an electrolyte 122, and an air electrode 123, and in this case, the fuel electrode 121 may be disposed on the side of the first end plate 101 and the air electrode 123 may be disposed on the side of the second end plate 102. In the case of a fuel cell, for example, in the fuel electrode 121, water generation due to hydrogen oxidation or a carbon compound oxidation reaction may occur, and in the air electrode 123, an oxygen ion generation reaction may occur due to decomposition of oxygen. In the case of a water electrolysis cell, the opposite reaction may occur, and for example, hydrogen gas may be generated by the fuel electrode 121 according to a reduction reaction of water, and oxygen may be generated by the air electrode 123. As another example, in the case of a fuel cell, a hydrogen decomposition (hydrogen ion generation) reaction may occur in the fuel electrode 121, and oxygen and hydrogen ions are combined in the air electrode 123 to generate water. In the case of a water electrolysis cell, a decomposition reaction of water (generation of hydrogen and oxygen ions) occurs from the fuel electrode 121 and oxygen may be generated by the air electrode 123. In the electrolyte 122, ions may move to the fuel electrode 121 or the air electrode 123.

The fuel electrode 121, the electrolyte 122, and the air electrode 123 may include a solid oxide. In detail, the fuel electrode 121 may include a cermet layer including a metal-containing phase and a ceramic phase. In this case, the metal-containing phase may include a metal catalyst such as nickel (Ni), cobalt (Co), copper (Cu), or alloys thereof, which acts as an electron conductor. The metal catalyst may be in a metallic state or may be in an oxide state. In the case of the ceramic phase of the fuel electrode 121, Gadolinia Doped Ceria (GDC), Samaria Doped Ceria (SDC), Ytterbia Doped Ceria (YDC), Scandia Stabilized Zirconia (SSZ), Ytterbia Ceria Scandia Stabilized Zirconia (YbCSSZ), etc. may be included.

The electrolyte 122 may include stabilized zirconia. In detail, the electrolyte 122 may include Scandia Stabilized Zirconia (SSZ), Yttria Stabilized Zirconia (YSZ), Scandia Ceria Stabilized Zirconia (SCSZ), Scandia Ceria Yttria Stabilized Zirconia (SCYSZ), Scandia Ceria Ytterbia Stabilized Zirconia (SCYbSZ), etc.

The air electrode 123 may include an electrically conductive material, for example, an electrically conductive perovskite material such as Lanthanum Strontium Manganite (LSM). Other conductive perovskites, for example, a metal such as Lanthanum Strontium Cobalt (LSC), Lanthanum Strontium Cobalt Manganese (LSCM), Lanthanum Strontium Cobalt Ferrite (LSCF), Lanthanum Strontium Ferrite (LSF), $La_{0.85}Sr_{0.15}Cr_{0.9}Ni_{0.1}O_3$ (LSCN) or Pt may also be used. In some embodiments, the air electrode 123 may include a mixture of an electrically conductive material and an ionically conductive ceramic material. For example, the air electrode 123 may include about 10 wt % to about 90 wt % of an electrically conductive material (e.g., LSM or the like) and about 10 wt % to about 90 wt % of an ion conductive material. In this case, the ion conductive material may include zirconia-based and/or ceria-based materials.

Figure 6:
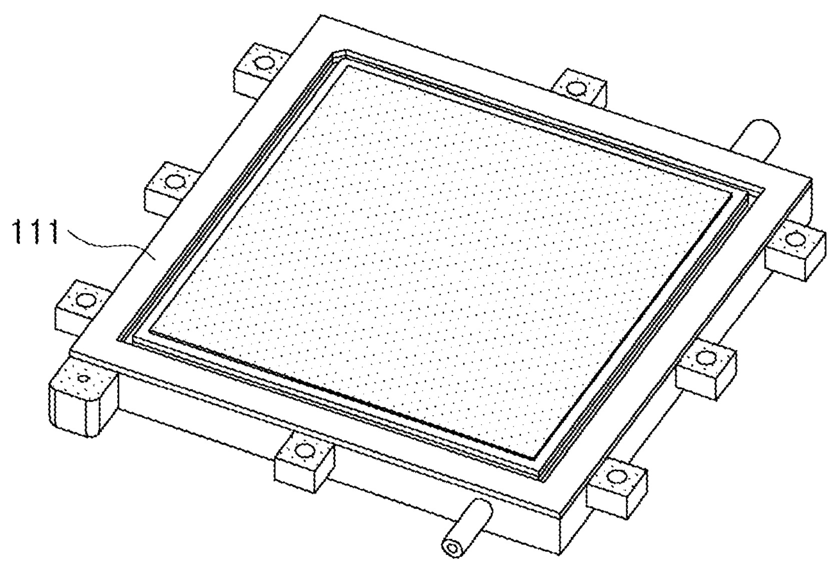
Figure 7:
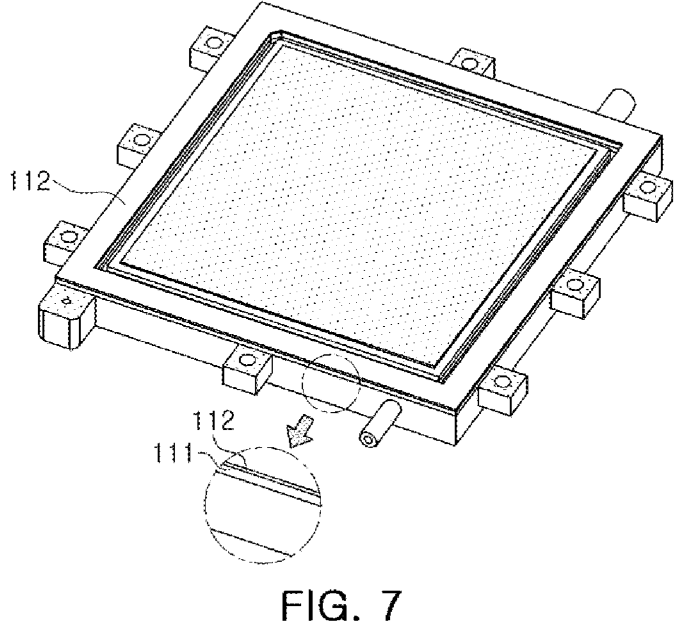
Figure 8:
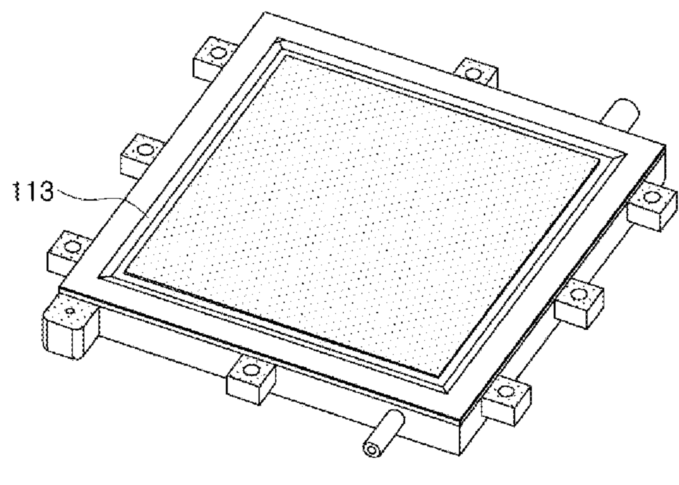

Referring to FIGS. 6 to 8, a gasket 111 and a stopper 112 may be disposed outside of the flow path 106, between the first and second end plates 101 and 102, and a sealant 113 covering a side surface of the solid oxide cell 120 may be disposed in the groove of the first end plate 101. In this case, as will be described later, when compressive force acts on the fastening portion 130, the stopper 112 may maintain a distance between the first and second end plates 101 and 102 to prevent the solid oxide cell 120 from being damaged. However, depending on an embodiment, at least one of the gasket 111, the stopper 112, and the sealant 113 may be excluded. The sealant 113 may perform a secondary sealing function, and may be disposed inside the gasket 111 and the stopper 112 and outside the solid oxide cell 120 and the inner gasket 110. The sealant 113 may be formed of a glass-based material, and in this case, the structure is densified at high temperatures, and thus, liquid or gas may be prevented from leaking.

Figure 9:
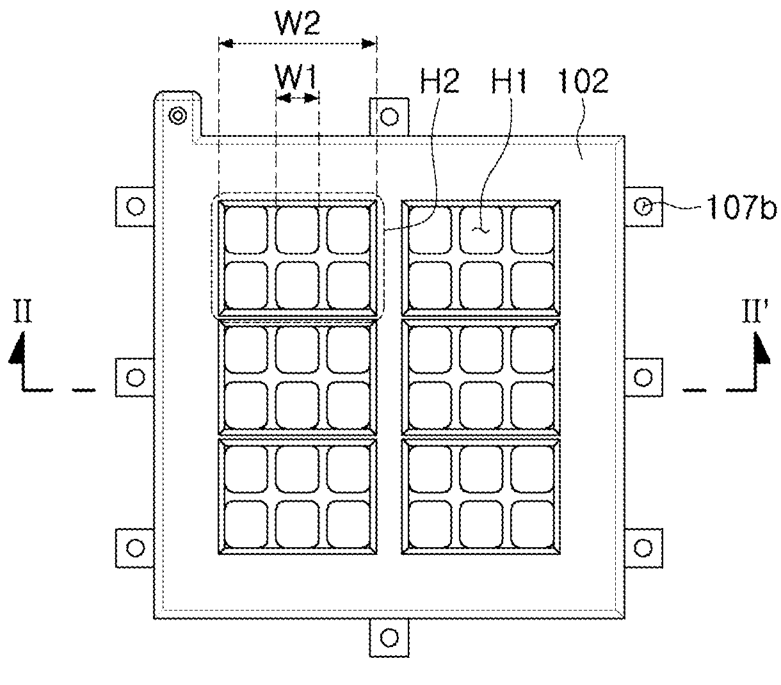
Figure 10:
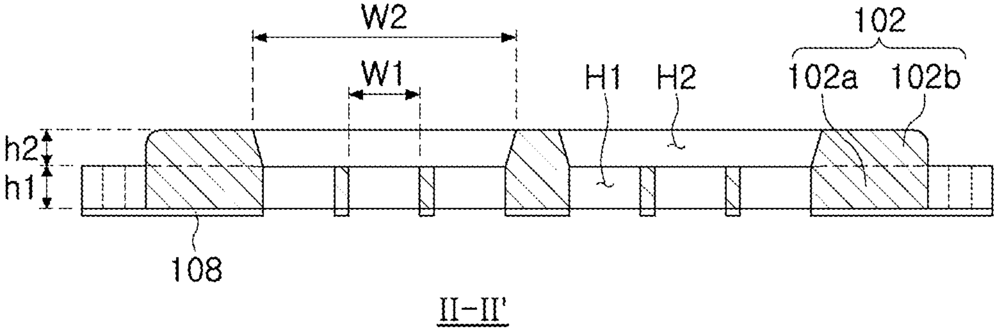

The second end plate will be described with reference to FIGS. 9 to 11. The second end plate 102 may include the current collecting layer 108 disposed on the solid oxide cell 120 and formed on the surface facing the solid oxide cell 120 as described above. The second end plate 102 includes a lower region 102*a* having a first through-hole H1 and an upper region 102*b* disposed on the lower region 102*a* and including a second through-hole H2. In the second end plate 102, the inner sidewall of the upper region 102*b* forming the second through-hole H2 is inclined such that the width W2 increases as the second through-hole H2 goes upwardly. In this case, the first and second through-holes H1 and H2 may be connected to each other in the vertical direction. As in the present embodiment, the second end plate 102 has the second through-hole H2 through which gas such as air may be introduced and discharged. In this embodiment, the shape of the second through-hole H2 is implemented as a tapered structure such that gas may be smoothly introduced and discharged by natural convection.

In describing the multistage structure of the second end plate 102 in more detail, first, it may be preferable that the second end plate 102 maintain rigidity to the extent that there is no deformation when the solid oxide cell 120 is compressed. To this end, the first through-hole H1 may be vertically disposed in the lower region 102*a* adjacent to the solid oxide cell 120. For example, the inner sidewall of the lower region 102*a* forming the first through-hole H1 may be disposed perpendicular to the upper surface of the solid oxide cell 120. In the case of the upper region 102*b* into which gas such as air is introduced, the second through-hole H2 is implemented in an inclined shape such that the width increases toward the top, thereby improving inflow and outflow efficiency of gas. In this case, the first through-hole H1 may be implemented to have a uniform width W1.

As illustrated, the second through-hole H2 may be greater than the first through-hole H1 in width (W2>W1), and in this case, the width may be a length measured in a lateral direction perpendicular to the vertical direction based on the drawing. As illustrated in FIG. 9, when viewed from the top of the solid oxide cell stack 100, a plurality of first through-holes H1 may be disposed within the second through-holes H2. In addition, the upper region 102*b* may include a plurality of second through-holes H2, and in this case, when viewed from the top of the solid oxide cell stack 100, a plurality of first through-holes H1 may be disposed in each of the plurality of second through-holes H2. In this manner, when disposing a plurality of first through-holes H1 in one taper-shaped second through-hole H2, since the area of the through-hole (i.e., the second through-hole) that is open externally may be further increased, gas inflow and discharge efficiency may be improved.

In addition, the thicknesses h1 and h2 of the lower region 102*a* and the upper region 102*b* of the second end plate 102 may vary depending on the overall thickness of the second end plate 102. First of all, in an embodiment, the thickness of the upper region 102*b* may be greater than the thickness of the lower region 102*a* (h2>h1). In the case in which the second end plate 102 has sufficient rigidity or is designed to be sufficiently thick so that deformation is not caused by compressive force by the fastening portion 130 or the like, the thickness of the upper region 102*b* may be formed to be greater than the thickness of the lower region 102*a* to more smoothly introduce air. Alternatively, in the case in which the second end plate 102 does not have sufficient rigidity, the thickness of the lower region 102*a* may be greater than the thickness of the upper region 102*b* (h1>h2) or may be the same as the thickness of the upper region 102*b* (h1=h2).

Figure 11:
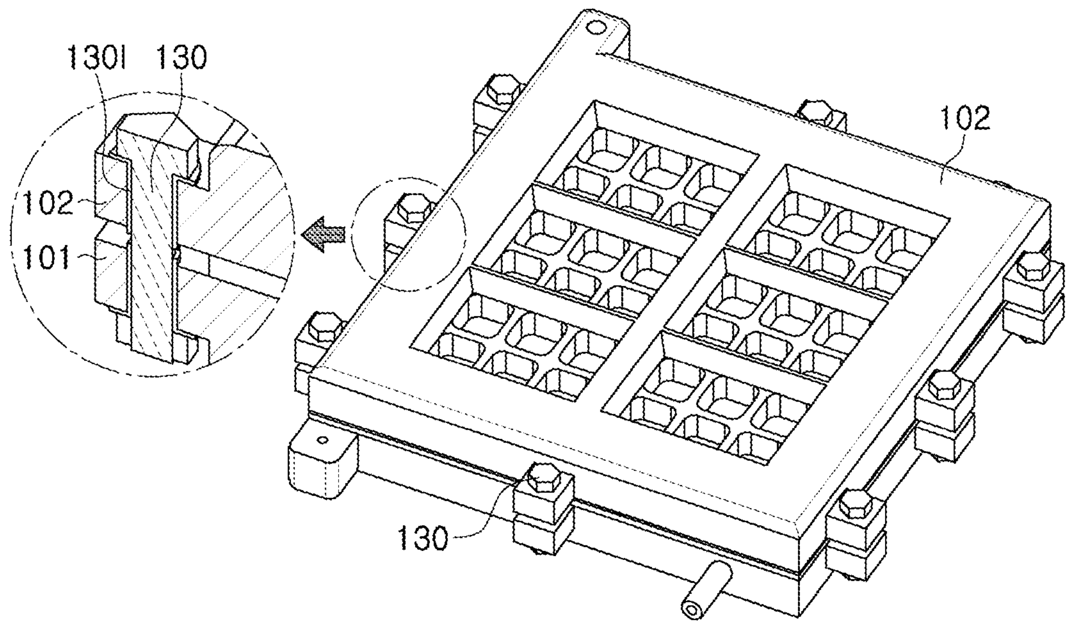

Referring to FIG. 11 illustrating a form in which the first and second end plates 101 and 102 are coupled to each other by the fastening portion 130, to connect the first and second end plates 101 and 102, the fastening portion 130 may be screwed into a through-hole outside the first and second end plates 101 and 102. In this embodiment, the fastening portion 130 may have a coefficient of thermal expansion lower than a coefficient of thermal expansion of the first and second end plates 101 and 102. Even when the fastening portion 130 is not tightly coupled to the first and second end plates 101 and 102 at room temperature, since compressive force is generated by the fastening portion 130 having a relatively low thermal expansion rate, a stable fastening structure may be obtained. The coefficient of thermal expansion of the fastening portion 130 and the end plates 101 and 102 may be designed to provide compressive force required at a target operating temperature. In detail, the fastening portion 130 uses the same material as the base material (e.g., nickel-based, iron-based, stainless-based, copper-based material, or the like) of the end plates 101 and 102, but a material of a different composition having low a coefficient of thermal expansion may be used. In the case in which the fastening portion 130 has electrical conductivity, since an unintended current path may occur, an insulating coating layer may be additionally formed on the surface of the fastening portion 130. In addition, a separate insulator 130I may be inserted between the fastening portion 130 and the inner wall of the through-hole of the plates 101 and 102.

On the other hand, as illustrated in FIG. 1, the solid oxide cell stack 100 may further include terminal portions 141 and 142 respectively connected to the current collecting layers 103 and 108. As will be described later, the plurality of solid oxide cell stacks 100 may be electrically connected to each other through the terminal portions 141 and 142.

Figure 12:
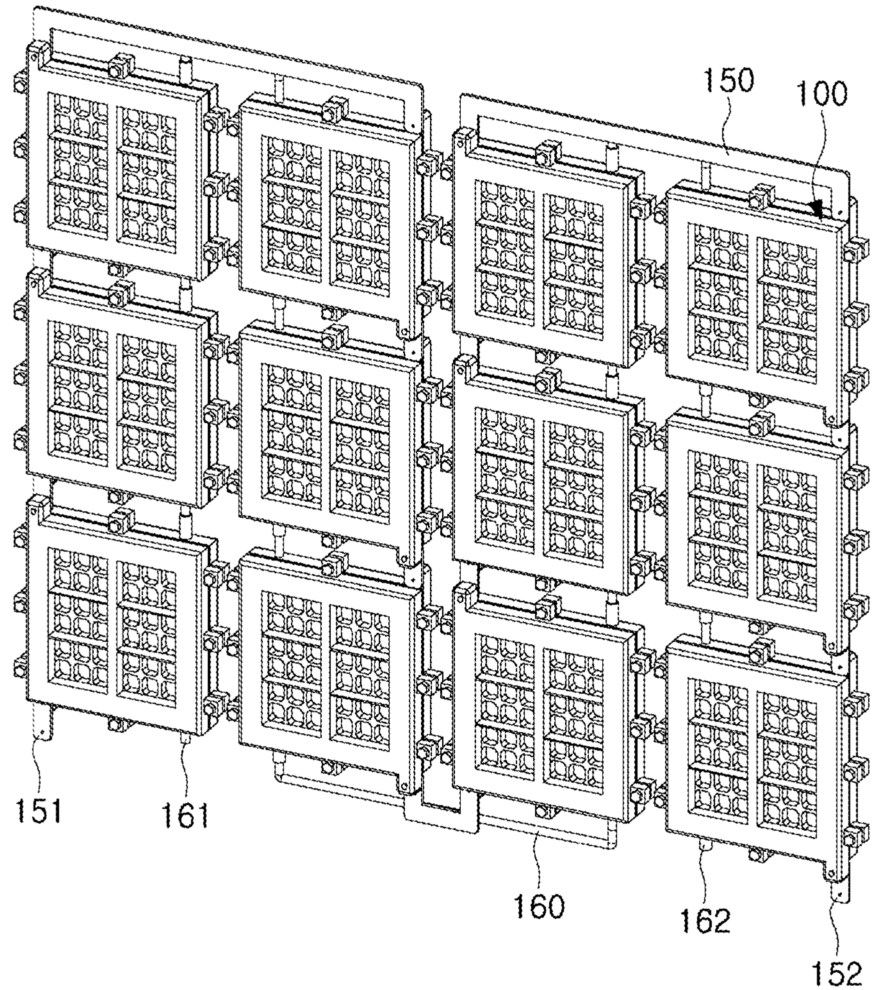
FIGS. 12 and 13 illustrate a connection structure of the solid oxide cell stack.
Figure 13:
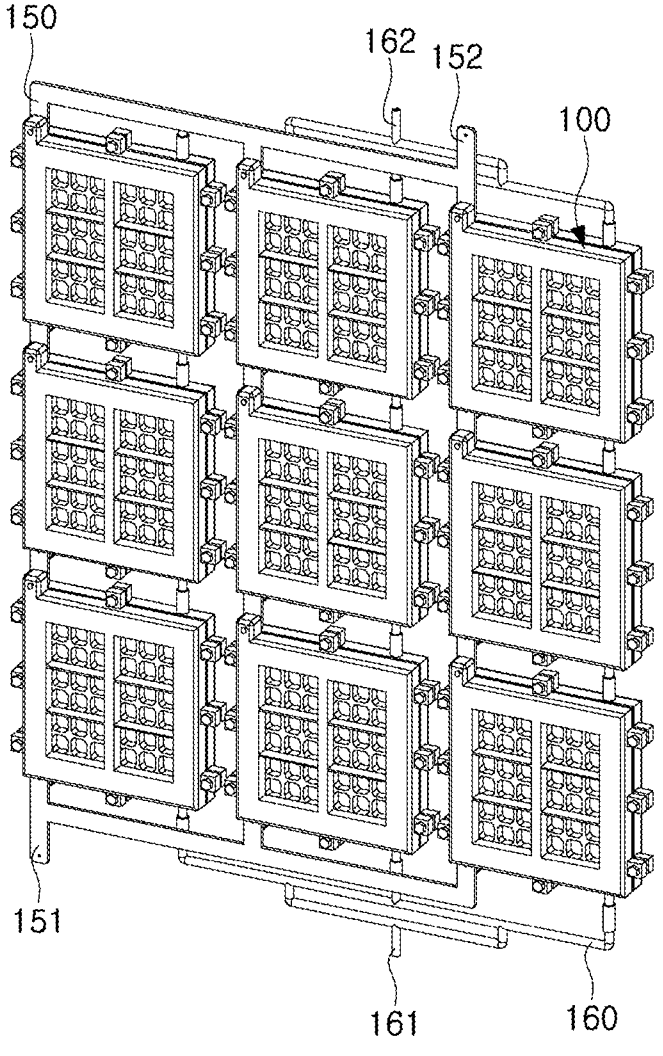

The above-described solid oxide cell stack 100 may be provided as a plurality of solid oxide cell stacks 100 to provide a structure in which they are connected to each other. FIGS. 12 and 13 illustrate a form in which the solid oxide cell stacks 100 are connected in series and parallel, respectively. By using the solid oxide cell stacks 100 in the form of a connection structure, usage for high voltage or high current may be expanded. In this case, the solid oxide cell stack 100 becomes one unit stack, and may be provided with a connection conductor 150 for electrical connection to each other and a connection flow path 160 serving as a fluid connection flow path. The connection structure of the solid oxide cell stack 100 may include a fluid inlet 161, a fluid outlet 162, and terminal portions 151 and 152.

As set forth above, in the case of a solid oxide cell stack according to an example, performance may be improved when used as a fuel cell or a water-electrolytic battery by providing an end plate having improved air inflow efficiency.

While example embodiments have been illustrated and described above, it will be apparent to those skilled in the art that modifications and variations could be made without departing from the scope of the present disclosure as defined by the appended claims.

What is claimed is:

1. A solid oxide cell stack comprising:

a first end plate having a flow path;

a solid oxide cell disposed on the first end plate; and a second end plate including a lower region disposed on the solid oxide cell and having a first through-hole, and an upper region disposed on the lower region and having a second through-hole, wherein in the second end plate, an inner sidewall of the upper region forming the second through-hole is inclined such that a width of the second through-hole increases in an upward direction.

2. The solid oxide cell stack of claim 1, wherein a width of the second through-hole is greater than a width of the first through-hole.

3. The solid oxide cell stack of claim 2, wherein when viewed from above, the first through-hole is disposed in plural in the second through-hole.

4. The solid oxide cell stack of claim 2, wherein the upper region includes the second through-hole in plural.

5. The solid oxide cell stack of claim 4, wherein when viewed from above, the first through-hole is disposed in plural in each of the plurality of second through-holes.

6. The solid oxide cell stack of claim 1, wherein the first through-hole has a uniform width.

7. The solid oxide cell stack of claim 1, wherein an inner sidewall of the lower region forming the first through-hole is disposed perpendicular to an upper surface of the solid oxide cell.

8. The solid oxide cell stack of claim 1, wherein a thickness of the upper region is greater than a thickness of the lower region.

9. The solid oxide cell stack of claim 1, wherein a thickness of the lower region is greater than or equal to a thickness of the upper region.

10. The solid oxide cell stack of claim 1, further comprising a fastening portion coupling the first and second end plates.

11. The solid oxide cell stack of claim 10, wherein the fastening portion has a coefficient of thermal expansion lower than a coefficient of thermal expansion of the first and second end plates.

12. The solid oxide cell stack of claim 1, wherein on a surface of at least one of the first and second end plates, facing the solid oxide cell, a current collecting layer is disposed.

13. The solid oxide cell stack of claim 12, further comprising a terminal portion connected to the current collecting layer.

14. The solid oxide cell stack of claim 12, wherein in at least one of the first and second end plates, a ceramic coating layer is disposed in at least a portion of an area other than an area in which the current collecting layer is disposed.

15. The solid oxide cell stack of claim 1, wherein the first end plate includes a groove provided around the flow path, and further includes a sealant disposed in the groove to cover a side surface of the solid oxide cell.

16. The solid oxide cell stack of claim 1, further comprising a gasket and a stopper disposed outside the flow path, between the first and second end plates.

17. The solid oxide cell stack of claim 1, wherein the solid oxide cell includes a fuel electrode, an air electrode, and an electrolyte disposed therebetween, wherein the fuel electrode is disposed on a side of the first end plate, and the air electrode is disposed on a side of the second end plate.

18. A solid oxide cell stack comprising:

a first end plate having a flow path;

a solid oxide cell disposed on the first end plate; and a second end plate including a lower region disposed on the solid oxide cell and having a first through-hole, and an upper region disposed on the lower region and having a second through-hole, wherein when viewed from above, the first through-hole is disposed in plural in the second through-hole.

19. The solid oxide cell stack of claim 18, wherein a width of the second through-hole increases in an upward direction.

20. The solid oxide cell stack of claim 18, wherein a width of the first through-hole is constant in an upward direction.

* * * * *